3,534,101
Patented Oct. 13, 1970

3,534,101
PREPARATION OF BERYLLIUM HYDRIDE-TRIALKY AMINE COMPLEXES
Lawrence H. Shepherd, Jr., Baton Rouge, La., and James M. Wood, Southfield, Mich., assignors to Ethyl Corporation, New York, N.Y., a corporation of Virginia
No Drawing. Filed Mar. 27, 1968, Ser. No. 716,670
Int. Cl. C07c 85/00; C07f 3/00
U.S. Cl. 260—583     3 Claims

ABSTRACT OF THE DISCLOSURE

Complexes of beryllium hydride with tertiary amines, containing one molecule of beryllium hydride for each tertiary amino nitrogen atom in the amine, are prepared by reaction of beryllium bis(trialkylaluminum monohydride) with a lower trialkyl amine.

This invention relates to and has as its principal object the provision of a novel method for the preparation of amine complexes of beryllium hydride. These amine compositions are molecular complexes of beryllium hydride with tertiary monoamines wherein the molar ratio of beryllium hydride to amine is 1:1 and wherein the amine components include trimethylamine, dimethylethylamine, methyldiethylamine, dimethylpropylamine and N,N-dimethylbenzyl amine. Of these, trimethylamine is preferred because of the ease with which it participates in the process of this invention.

In accordance with this invention these complexes are prepared by reacting beryllium bis(trialkylaluminum monohydride) of the formula $$Be(R_3AlH)_2$$

wherein R represent alkyl, with a trialkylamine to produce a reaction product containing beryllium hydride trialkylamine and trialkylaluminum trialkylamine, and separating the beryllium hydride trialkylamine from the reaction product.

A preferred embodiment of this invention comprises reacting beryllium bis(trialkylaluminum monohydride) with liquid trimethylamine at ambient temperature to produce a reaction product containing beryllium hydride trimethylamine and trialkylaluminum trimethylamine, and separating said beryllium hydride trimethylamine from said reaction product.

A particularly preferred embodiment comprises reacting beryllium bis(triethylaluminum monohydride) with liquid trimethylamine at ambient temperature to produce a reaction product containing beryllium hydride trimethylamine and triethylaluminum trimethylamine, and separating said beryllium hydride trimethylamine from said reaction product.

In the reaction between the complex reactant, Be(AlR₃H)₂, and the amine, the proportions can vary from a 100 percent or greater excess of the complex to a 100 percent or greater excess of the amine. But a considerable excess, say from 10 up to about 50 percent of the amine is preferred, both because it is the cheaper of the reactants and because the excess amine can serve as reaction solvent.

The beryllium bis(trialkylaluminum monohydride) reactant can be prepared by the direct combination, in approximately equivalent amounts, of a dialkylaluminum monohydride and the corresponding beryllium dialkyl. This reactant can be employed, without separation or purification, in the amine reaction of the present invention.

Since the alkyl groups contained in the aluminum and beryllium precursors of the beryllium bis(trialkylaluminum monohydride) reactant do not appear in the final product, their choice is in no way critical. Thus, each alkyl group can contain from one to about eight or more carbon atoms. However, the amine reactants must be tertiary amines and are limited to very low members of the aliphatic series. In the reaction between the alkylaluminum hydride and the beryllium alkyl, an excess of the former (this can range from 1 to a 100 percent or greater excess) is desirable to assure that the Be(AlR₃H)₂ reactant contains hydrogen at least equivalent to the beryllium. As noted above, the preferred beryllium bis(trialkylaluminum monohydride) reactant is beryllium bis(triethylaluminum monohydride) and thus it is desirable to form this compound from diethylberyllium and diethylaluminum hydride.

The process of the present invention exhibits a number of significant advantages over previously published methods for the preparation of beryllium hydride. Thus the amine complexes formed by the process of this invention represent the only known soluble form of beryllium hydride which can be readily dissociated to yield the free hydride.

The invention will be more fully understood by reference to the following illustrative example.

EXAMPLE 1

Beryllium hydride trimethylamine

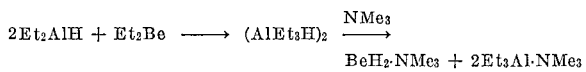

Into a flask were introduced, under nitrogen, 10.4 grams of 95 percent diethylaluminum monohydride. Freshly distilled diethylberyllium (3.85 grams) was added and the components were mixed thoroughly.

A reactor was prepared consisting of a flask provided with a magnetic stirring bar, a nitrogen inlet and a reflux condenser. The condenser was cooled by means of a Dry Ice-acetone mixture and 40 milliliters of trimethylamine, previously purified by distillation from lithium aluminum hydride, was condensed into the reactor.

A portion (12.56 grams) of the above diethylalumimum monohydride-diethylberyllium mixture was added slowly, with vigorous stirring, to the trimethylamine in the reactor. The flow of coolant in the condenser was interrupted, and the reaction mixture was stirred for 16 hours at room temperature to remove excess trimethylamine. A solid residue formed, which was separated by filtration, washed with pentane, vacuum dried for 15 minutes and analyzed.

ANALYSIS, WEIGHT, PERCENT

|  |  | Theory for BeH₂·NMe₃ |
| --- | --- | --- |
| Aluminum | 0.03 | 0 |
| Beryllium hydride | 15.1 | 15.9 |
| Trimethylamine | 80.3 | 84.4 |

When the process of Example 1 is repeated using dimethylethylamine, methyldiethylamine or triethylamine in place of trimethylamine, similar results are obtained.

The reaction temperature is limited by the volatility of the amine reactant. Temperatures from −40° C. to 60° C. or above are satisfactory but room temperature is conveniently maintained and is therefore preferred. Temperatures below −40° C. are of limited utility because of the low reaction rate, solubility and fluidity under such conditions.

Pressure is not a critical factor in the reaction. Pressures below atmospheric introduce problems because of the volatility of the amine but pressures from 1 to 100 atmospheres or more can be used if suitable equipment is provided. Atmospheric pressure is generally preferred because of the associated ease of manipulation and economy of equipment but, in the cases of some of the more volatile amines, such as trimethylamine, pressures in excess of atmospheric are useful for the purpose of maintaining the amines in the liquid phase.

The reactions were uniformly carried out under a protective atmosphere of dry nitrogen, but any atmosphere inert with respect to reactant and product can be used. For example, helium, neon, argon, krypton, xenon and saturated aliphatic hydrocarbons constitute satisfactory inert atmospheres.

For the above procedure, the reaction time is simply that required to carry the reaction to a satisfactory degree of completion. This period can range from an hour or less to ten days or more depending upon the particular reaction conditions employed.

The compounds produced by the process of this invention are useful in the metal plating of substrates, in the preparation of pure metallic beryllium and as reducing agents for such organic compounds as acids, esters, nitriles, ketones, aldehydes and olefins. By pyrolysis under controlled conditions, they yield beryllium hydride which is useful as a source of storable hydrogen, as a medium for the metal plating of substrates, as a source (by thermal decomposition) of pure metallic beryllium and as a component of jet and rocket fuels.

What is claimed is:
1. Process for the preparation of beryllium hydride trimethylamine which comprises reacting beryllium bis (trialkylaluminum monohydride), wherein each alkyl group contains from one to about eight carbon atoms, with liquid trimethylamine at ambient temperature to produce a reaction product containing beryllium hydride trimethylamine and trialkylaluminum trimethylamine, and separating said beryllium hydride trimethylamine from said reaction product.

2. The process of claim 1 wherein said beryllium bis (trialkylaluminum monohydride) is beryllium bis(triethylaluminum monohydride).

3. The process of claim 1 wherein said trimethylamine is presented in an amount corresponding to an excess of from 10 to about 50 percent, based upon the beryllium bis(trialkylaluminum monohydride) reactant employed.

No references cited.

CHARLES B. PARKER, Primary Examiner

R. L. RAYMOND, Assistant Examiner

U.S. Cl. X.R.

23—360; 44—72; 49—109; 260—448

PO-1050
(5/69)

UNITED STATES PATENT OFFICE
CERTIFICATE OF CORRECTION

Patent No. 3,534,101         Dated  October 13, 1970

Inventor(s) Lawrence H. Shepherd, Jr. and James M. Wood

It is certified that error appears in the above-identified patent and that said Letters Patent are hereby corrected as shown below:

Column 1, Patent Title reads "PREPARATION OF BERYLLIUM HYDRIDE-TRIALKY AMINE COMPLEXES", should read -- PREPARATION OF BERYLLIUM HYDRIDE-TRIALKYL AMINE COMPLEXES --. Column 1, line 37 reads "R represent", should read -- R represents --. Column 2, line 28 reads "$\rightarrow (AlEt_3H)_2$", should read -- $\rightarrow Be(AlEt_3H)_2$ --; line 50 reads "Analysis, Weight, Percent", should read -- Analysis, Weight Percent --; line 52, heading over second column omitted, should read -- Found --; line 53 reads "Alumlnum", should read -- Aluminum --. Column 4, line 15 reads "is presented", should read -- is present --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents